W. McCORD.
Vehicle-Spring.

No. 200,072.    Patented Feb. 5, 1878.

Witnesses
Otto Hufeland.
Chas. Wahlers.

Inventor.
William McCord
by
Van Santvoord & Hauff

UNITED STATES PATENT OFFICE.

WILLIAM McCORD, OF SING SING, NEW YORK.

IMPROVEMENT IN VEHICLE-SPRINGS.

Specification forming part of Letters Patent No. 200,072, dated February 5, 1878; application filed January 7, 1878.

*To all whom it may concern:*

Be it known that I, WILLIAM MCCORD, of Sing Sing, Westchester county, New York, have invented a new and useful Improvement in Springs for Vehicles, which improvement is fully set forth in the following specification, reference being had to the accompanying drawing, in which—

Figure 1:
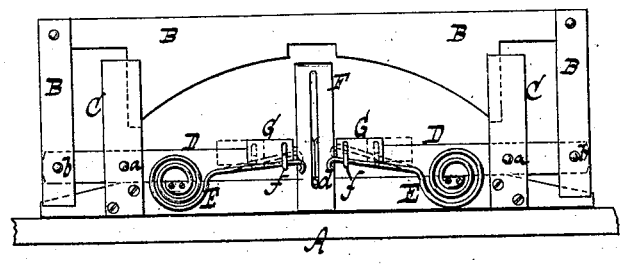
Figure 2:
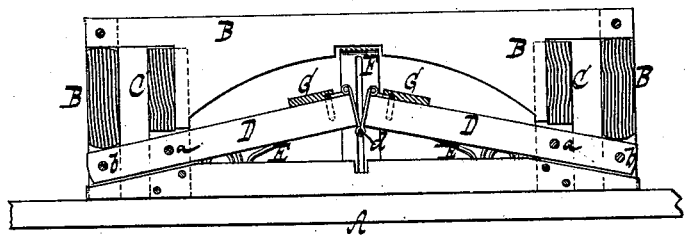

Figure 1 is a front view when the springs are at rest. Fig. 2 is a front view, some parts being cut away, the springs being stretched, as when a load is on the vehicle.

Similar letters indicate corresponding parts.

This invention consists in the combination, in a spring for vehicles, of two scale-beams which have their fulcra in standards rising from the supporting bar or axle, a yoke which rests on pivots secured in the outer ends of the scale-beams, and which yoke is guided in its vertical movements by said standards, suitable springs which act on the scale-beams, and a joint for connecting the inner ends of said scale-beams, the said springs being connected with the supporting bar or axle, and with the said beams between the pivotal points of the latter and the inner jointed ends of the same, so that a downward pressure applied to the yoke is equally distributed over all the springs acting on the scale-beams, and the load in a vehicle can be placed on one side or on the other without producing any injury or inconvenience; also, in the combination, in a spring for vehicles arranged as above described, of slides which can be moved nearer to or farther from the fulcra of the scale-beams, so as to increase or lessen the efficiency of the springs, as may be desired. With the yoke, the scale-beams, and the springs is also combined a standard, which forms a guide for the inner ends of the scale-beams and a stop for the yoke, so as to prevent injury to the springs.

In the drawing, the letter A designates the supporting-bar, which may be either the axle itself or attached firmly to the same. B is the yoke, on the top of which the body of the vehicle rests. C C are standards, which rise from the supporting-bar A. In these standards are pivots *a a*, which form the fulcra for the scale-beams D D. These standards C C also form guides for the yoke B to slide in. The yoke B is attached, by pivots *b b*, to the outer ends of the scale-beams D D, and when a load presses the yoke down to the position shown in Fig. 2 the parts of the scale-beams inside the fulcra *a a* rise up, and thus throw the strain of the load on the springs E E. These springs, in the example shown in the drawing, are coiled springs; but they can be made in any desired form, and of any suitable material, without changing the nature of my invention. The number of springs can also be varied to suit circumstances.

The springs are connected with the supporting bar or axle A at one end, and at the other end with the scale-beams, so as to exert a pressure on said beams between the pivotal points of the latter and their inner jointed ends, as shown. The scale-beams D D are also hinged together at *d*, and hence, if a pressure should be exerted only at one extremity of the yoke B, this pressure would, by this arrangement, be distributed equally over the springs E E, and hence no strain or injury on any one spring will be caused by the load being placed on one side. The standard F, attached to the supporting-bar, guides the hinge *d* in the slot provided for that purpose.

The action of the springs E E is transmitted to the scale-beams D by means of hooks or rings *f f*, Fig. 1, or by any other suitable attachment. These hooks or rings *f f* are attached to slides G G, which can be placed at any desirable point along the scale-beams D D, as shown by dotted lines in Fig. 1. Thus, by moving these slides G G nearer to or farther from the fulcra *a a*, the efficiency of the springs E E can be diminished or increased to suit circumstances. The standard F also, when the yoke B is pressed down a certain distance, strikes against said yoke B, and, by hindering it from being pressed down any farther, removes all danger of the springs being broken by over-strain.

If desired, the standards C C can also be made of a suitable height, and effect this same object in connection with or independently of the standard F.

What I claim as new, and desire to secure by Letters Patent, is—

1. The combination, with the supporting bar or axle A, of two jointed beams, D D, the vertical standards C C, to which said beams are pivoted, a yoke, B, guided in its vertical movement by the standards C C, and pivoted at its ends to the outer ends of the beams, and springs E, connected with the supporting-bar and with the beams, so as to exert pressure on the latter between the pivotal points and jointed ends of the same, substantially as described.

2. The combination, with the scale-beams D D, springs E E, supporting-bar A, and yoke B, of slides G G for regulating the power of the springs, substantially as set forth.

3. The combination, with the scale-beams D D, springs E E, supporting-bar A, yoke B, and slides G G, of a standard, F, provided with a guide-slot, which standard forms a stop for the yoke B, and prevents injury to the springs, substantially as set forth.

In testimony that I claim the foregoing I have hereunto set my hand and seal this 2d day of January, 1878.

WM. McCORD. [L. S.]

Witnesses:
  J. HOLLY PLATT,
  LEWIS H. PLATT.